United States Patent
Vass et al.

(10) Patent No.: US 9,982,517 B2
(45) Date of Patent: May 29, 2018

(54) COILED TUBING CONNECTOR FOR DOWNHOLE TOOLS

(71) Applicant: Owen Oil Tools LP, Houston, TX (US)

(72) Inventors: Bradley Vass, Fort Worth, TX (US); Timothy Edward LaGrange, Rainbow, TX (US); Lyle Andrich, Grandview, TX (US)

(73) Assignee: OWEN OIL TOOLS LP, Houston, TX (US)

( * ) Notice: Subject to any disclaimer, the term of this patent is extended or adjusted under 35 U.S.C. 154(b) by 235 days.

(21) Appl. No.: 14/750,112

(22) Filed: Jun. 25, 2015

(65) Prior Publication Data

US 2015/0376993 A1    Dec. 31, 2015

Related U.S. Application Data

(60) Provisional application No. 62/018,303, filed on Jun. 27, 2014.

(51) Int. Cl.

| | |
|---|---|
| *E21B 43/116* | (2006.01) |
| *E21B 43/1185* | (2006.01) |
| *E21B 43/11* | (2006.01) |
| *E21B 17/02* | (2006.01) |
| *E21B 17/20* | (2006.01) |
| *F16L 37/133* | (2006.01) |
| *F16L 37/138* | (2006.01) |
| *F16L 21/00* | (2006.01) |
| *F16L 37/10* | (2006.01) |

(52) U.S. Cl.
CPC ........ *E21B 43/11855* (2013.01); *E21B 17/02* (2013.01); *E21B 17/20* (2013.01); *E21B 43/11* (2013.01); *E21B 43/116* (2013.01); *F16L 21/00* (2013.01); *F16L 37/10* (2013.01); *F16L 37/133* (2013.01); *F16L 37/138* (2013.01)

(58) Field of Classification Search
CPC ...... E21B 17/043; E21B 17/046; E21B 23/02; E21B 43/1185; E21B 43/11855; E21B 43/116; E21B 43/11852; E21B 43/11
See application file for complete search history.

(56) References Cited

U.S. PATENT DOCUMENTS

| | | | |
|---|---|---|---|
| 4,139,222 A | 2/1979 | Loland | |
| 4,451,069 A | 5/1984 | Melone | |
| 4,694,878 A | 9/1987 | Gambertoglio | |
| 4,815,540 A | 3/1989 | Wallbillich, III | |
| 5,273,121 A * | 12/1993 | Kitney | E21B 43/119 166/55.1 |
| 5,366,014 A | 11/1994 | George | |
| 5,452,923 A | 9/1995 | Smith | |

(Continued)

OTHER PUBLICATIONS

PCT/US2015/038074—International Search Report dated Jun. 26, 2015.

*Primary Examiner* — Nicole Coy
*Assistant Examiner* — Yanick A Akaragwe
(74) *Attorney, Agent, or Firm* — Mossman, Kumar & Tyler, PC

(57) ABSTRACT

A quick connection for coiled tubing run tools eases the assembly and disassembly while deploying such tools. The quick connection utilizes a locking collet and an inner mandrel with locking sleeve system. Such a quick connection does not require perfect alignment between mating pieces.

9 Claims, 3 Drawing Sheets

(56) References Cited

U.S. PATENT DOCUMENTS

| | | | |
|---|---|---|---|
| 5,823,266 A * | 10/1998 | Burleson | E21B 17/06 166/242.6 |
| 6,059,042 A | 5/2000 | Huber et al. | |
| 6,098,716 A | 8/2000 | Hromas et al. | |
| 6,851,471 B2 | 2/2005 | Barlow et al. | |
| 7,210,524 B2 | 5/2007 | Sloan et al. | |
| 7,231,982 B2 | 6/2007 | Sloan et al. | |
| 7,661,474 B2 | 2/2010 | Campbell et al. | |
| 8,079,296 B2 * | 12/2011 | Barton | E21B 43/1185 175/4.56 |
| 8,875,796 B2 | 11/2014 | Hales et al. | |
| 8,910,713 B2 | 12/2014 | Zuklic et al. | |
| 2006/0048940 A1 | 3/2006 | Hromas et al. | |
| 2008/0245255 A1 * | 10/2008 | Barton | E21B 43/11857 102/313 |

\* cited by examiner

COILED TUBING CONNECTOR FOR DOWNHOLE TOOLS

CROSS REFERENCE TO RELATED APPLICATIONS

This application claims priority from U.S. Provisional Application Ser. No. 62/018,303, filed Jun. 27, 2014, the entire disclosure of which is incorporated herein by reference in its entirety.

TECHNICAL FIELD

The present disclosure relates to devices and methods for connecting downhole tools.

BACKGROUND

One of the activities associated with the completion of an oil or gas well is the perforation of a well casing. During this procedure, perforations, such as passages or holes, are formed in the casing of the well to enable fluid communication between the wellbore and the hydrocarbon producing formation that is intersected by the well. These perforations are usually made with a perforating gun loaded with shaped charges. The gun is lowered into the wellbore on coiled tubing until it is at a desired target depth; e.g., adjacent to a hydrocarbon producing formation.

One drawback with running tooling on coiled tubing involves correct alignment between threads on the two mating parts. This requires the two parts to be manually handled when hanging in the vertical position. This process becomes difficult to position the two mating pieces due to the weight of the gun assembly and environmental conditions (e.g., high winds). Other issues include cross threading, and damaging the straight threads between the mating parts. This damage can occur due to misalignment of the threads.

The present disclosure addresses these and other drawbacks of the prior art.

SUMMARY

In aspects, the present disclosure provides a quick connection for coiled tubing run tools. These connections ease the assembly and disassembly while deploying such tools. In embodiments, the connection utilizes a locking collet and an inner mandrel with locking sleeve system. Such a connection does not require perfect alignment between mating pieces.

It should be understood that examples of certain features of the disclosure have been summarized rather broadly in order that the detailed description thereof that follows may be better understood, and in order that the contributions to the art may be appreciated. There are, of course, additional features of the disclosure that will be described hereinafter and which will in some cases form the subject of the claims appended thereto.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DETAILED DESCRIPTION

Figure 1:
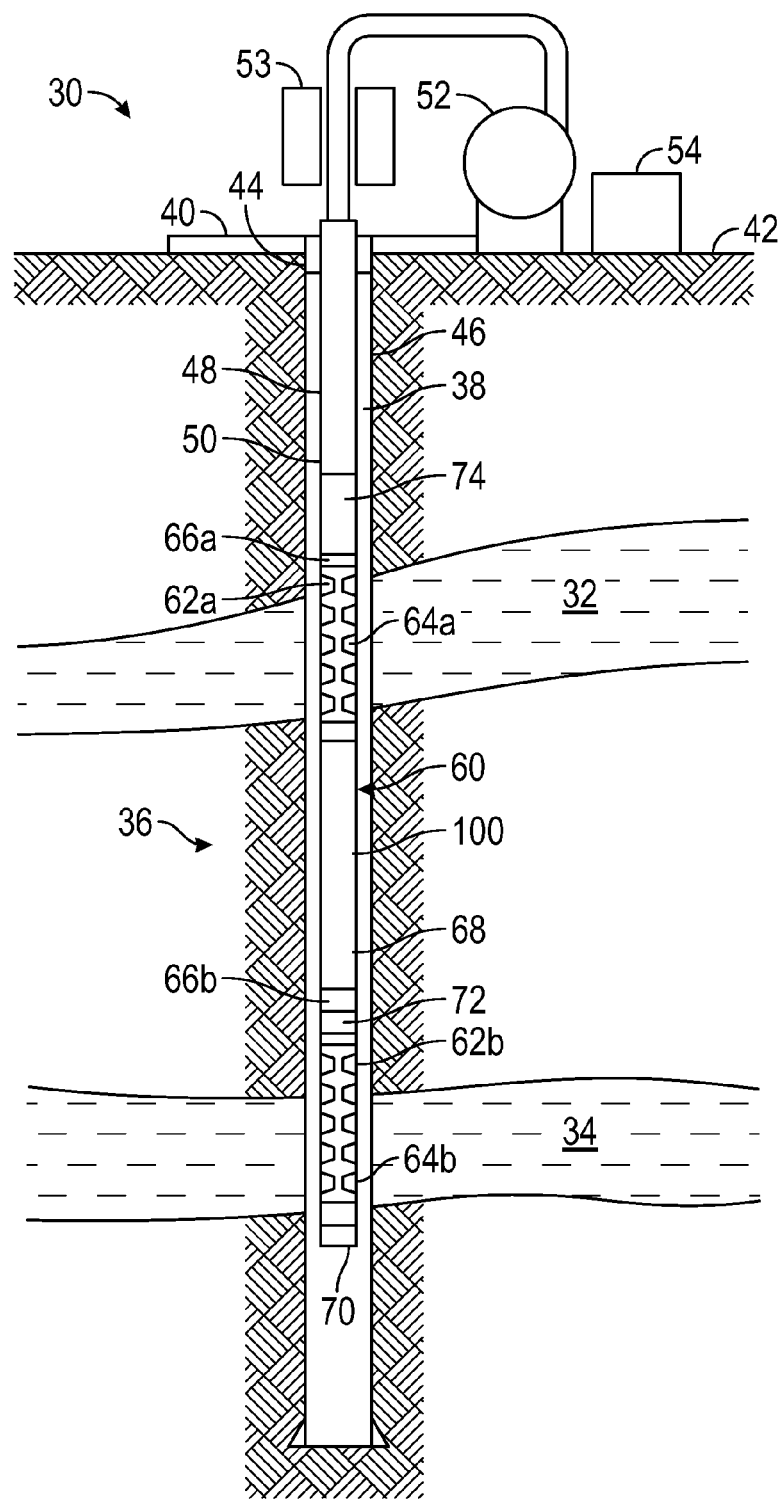
FIG. 1 schematically illustrates an elevation view of a surface facility adapted to perform one or more pre-defined tasks in a wellbore using one or more downhole tools.

In one aspect, the present disclosure relates to devices and methods for providing a quick connect housing that is structurally and functionally integrated into a time delay module. The present disclosure is susceptible to embodiments of different forms. For example, the quick connect housing can be adapted to other downhole tools such as packers, tubing cutters, wellbore patches, and other wellbore completion tools. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

Referring initially to FIG. 1, there is shown a well construction and/or hydrocarbon production facility 30 positioned over subterranean formations of interest 32, 34 separated by a gap section 36. The teachings of the present disclosure, however, may be applied to any type of subsurface formation. The facility 30 can be a land-based or offshore rig adapted to drill, complete, or service a wellbore 38. The facility 30 can include known equipment and structures such as a platform 40 at the earth's surface 42, a wellhead 44, and casing 46. A work string 48 suspended within the wellbore 38 is used to convey tooling into and out of the wellbore 38. The work string 48 can include coiled tubing 50 injected by a coiled tubing injector 52 and a lubricator 53. Other work strings 48 can include tubing, drill pipe, wire line, slick line, or any other known conveyance means. A surface control unit (e.g., a power source and/or firing panel) 54 can be used to monitor and/or operate tooling connected to the work string 48.

In one embodiment of the present disclosure, a perforating gun train 60 is coupled to an end of the work string 48. An exemplary gun train 60 includes a plurality of guns or gun sets 62a-b, each of which includes perforating shaped charges 64a-b, and detonators or firing heads 66a-b. It should be understood that the perforating gun train 60 can include three or more guns. Also, while a 'top-down' firing sequence is described, it should be understood that a 'bottom-up' sequence may also be utilized. That is, instead of the top most gun being fired first with the lower guns sequentially firing, the bottom most gun may be fired with the upper guns sequentially firing.

In some situations, it may be desirable to perforate one formation by firing a first gun and then move the gun train to another formation. An arrangement for accommodating such movement involves initiating the firing of a first gun and using the firing of the first gun to initiate the firing of a second gun. To provide the time necessary to move the guns between two formations, a time delay module 100 may be inserted between two guns.

Figure 2:
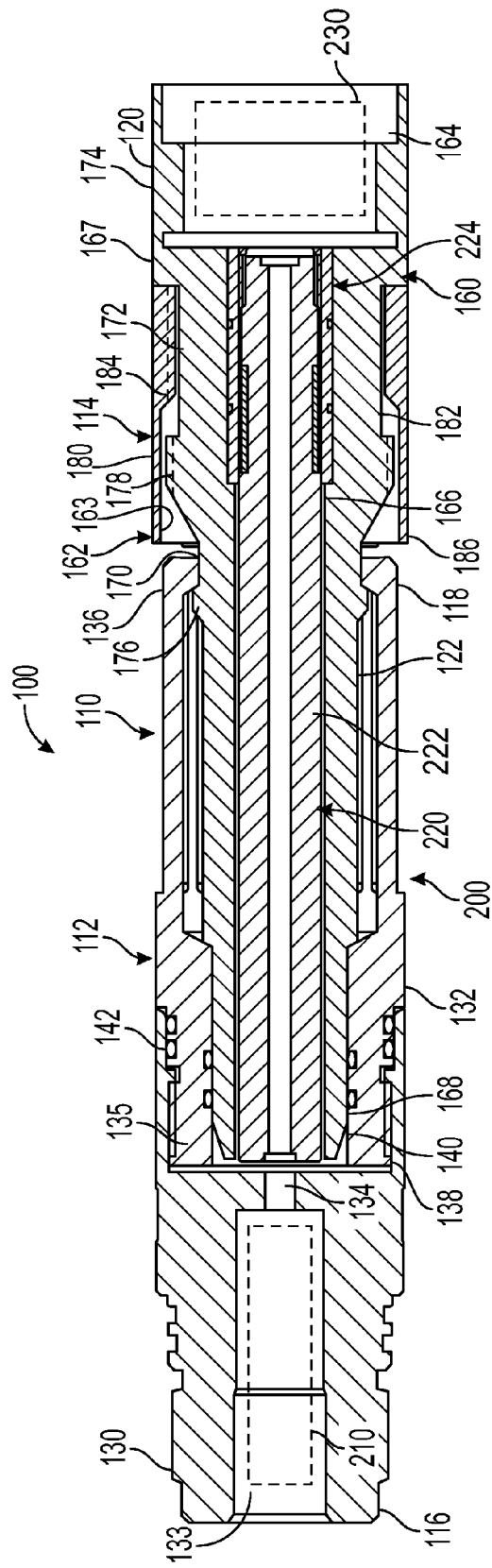
FIG. 2 illustrates a side sectional view of a quick connect and a time delay module according to one embodiment of the present disclosure.

Referring now to FIG. 2, there is shown further details of a time delay module 100 configured to provide a predetermined amount of time delay for moving a gun train 60 (FIG. 1) between two formations. Advantageously, the time delay module 100 may be include features that enable a quick connection between the perforating guns 62a and 62b (FIG. 1). In one non-limiting embodiment described below, the time delay module 100 includes a quick connect housing 110 and a time delay assembly 200.

The quick connect housing 110 may use a translating action to interconnect the guns 62 *a,b* (FIG. 1). In one arrangement, the housing 110 may include an upper section 112 and a lower section 114. The upper section 112 has a gun end 116 that connects with a first perforating gun such as gun 62a (FIG. 1) and a connector end 118. The lower section 114 has a gun end 120 that connects with a second perforating gun such as gun 62b (FIG. 1) and a connector end 122. A connection is formed by mating the connector ends 118, 122 of the sections 112, 114, respectively.

In one embodiment, the upper section 112 includes a cylindrical base 130 and a collet 132. The base 130 may include an opening 134 that provides communication between a chamber 133 formed proximate to the gun end 116 and a bore 138 that traverses the base 130. The collet 132 may include a passage 140, a ring 135 that seats within the bore 138, and a plurality of fingers 136 that axially project from the ring 135. Additionally, the upper section 112 may also include seals 142 that form a fluid barrier between the base 130 and the ring 135.

The fingers 136 are circumferentially distributed and formed of a flexible material such as spring steel. Thus, the fingers 136 may be forced to bend radially outward and return to an original shape when the force is removed.

In one embodiment, the lower section 114 may include a mandrel 160 and a locking sleeve 162. The mandrel 160 may be a generally cylindrical member that includes a chamber 164 proximate to the gun end 120 and in communication with an adjacent bore 166. The mandrel 160 may have a pin section 168, a locking section 170, a sleeve support section 172, and a base section 174. The pin section 168 has an outer diameter sized to be received into the bore 140 of the collet 132. The locking section 170 may have a projection 176 that are sized to axially engage the fingers 136. By axial engagement, it is meant that engagement occurs between surfaces that are not parallel with the longitudinal axis of the upper and lower sections 112, 114. For example, the engagement can occur along inclined surfaces such that a compressive loading can occur. The sleeve support section 172 may include a shoulder region 178 on which are formed external threads 180 and a reduced diameter landing 182.

The locking sleeve 162 may be disposed on and surround the sleeve support section 172. The locking sleeve 162 may be a tubular body having a bore 163 defined by an inner surface on which are formed inner threads 184 that are complementary to the external threads 180. The bore 163 has a first section through which the shoulder region 178 can slide without obstruction. Thus, the sleeve 162 can slide axially along the landing 182 without rotation and then rotationally engage the externals threads 180. A lip 186 of the locking sleeve 162 is sized to receive and enclose the fingers 136 when they are not bent radially outward; i.e., the fingers 136 are in a radially relaxed state. The length of the first section is selected to allow the lip 186 to axially slide over and surround the fingers 136/

Advantageously, the quick connect housing 110 may be integrated with the time delay assembly 200 such that mating the quick connect upper and lower sections 112, 114 also completes assembly of the time delay assembly 200. In one non-limiting embodiment, the time delay assembly 200 may include an initiator assembly 210 integrated into the upper section 112 and a fuse assembly 220 and a detonation transfer assembly 230 integrated into the lower section 114.

The initiator assembly 210 may include an explosive booster charge (not shown) that is energetically coupled to a detonator cord (not shown) associated with an immediately adjacent perforating gun. However, the initiator assembly 210 may also be energetically coupled to other sources for a detonation such as a firing pin, an igniter assembly, or another booster. The initiator assembly 210 may be positioned inside the chamber 133 of the base 130 of the upper section 112 and generate a high-order output when activated. A high-order output generally consists of shock waves (i.e., high-amplitude pressure waves) and thermal energy. Such detonations have a duration of no more than ten seconds and are more typically no greater than a second or no greater than a millisecond. This high order output travels to the bore 138 via the passage 134.

The fuse assembly 220 may include one or more time delay fuse(s) element 222 and a fuse support 224 positioned in the lower section 112. For instance, the fuse assembly 220 may be positioned inside the bore 166 of the mandrel 160. The fuse support 224 may be a tubular member secures the fuse element 222 within the bore 166. When so positioned, the high-order output exiting the passage 134 can impinge and detonate the fuse element(s) 222.

The time delay fuse element 222 may provide a specified time delay (e.g., 6 minutes, 9 minutes, etc.) for adjusting or controlling the time needed for the gun train 60 to travel to the depth of the next formation to be perforated. Burn times less than one minute are generally not considered adequate to move a perforating gun. Thus, the burn time of the fuse element 222 may be at least one minute, at least five minutes, or at least eight minutes. By adjustable or controllable, it is meant that the time delay mechanism can be configured to increase or decrease the time between the firing of the first gun 62a and the eventual firing of the gun 62b. In one embodiment, the time delay mechanism includes a combination of energetic materials, each of which exhibit different burn characteristics, e.g., the type or rate of energy released by that material. By appropriately configuring the chemistry, volume, and positioning of these energetic materials, a desired or predetermined time delay can be in the firing sequence. Generally, the energetic materials can include materials such as RDX, HMX that provides a high order detonation and a second energetic material that provides a low order detonation. Also, the number of fuses may be varied to control the duration of the time delay.

The detonator transfer assembly 230 may include one or more boosters that are detonated by the time delay fuse element 224. The detonator transfer assembly 230 may be positioned inside the chamber 164 of the mandrel 160. When detonated by the fuse assembly 220 in the adjacent bore 166, the detonator transfer assembly 230 generates a high-order output that initiates the firing of the lower gun 62b (FIG. 1). The duration of the detonation of the detonation transfer assembly 230 may be no more than ten seconds and are more typically no greater than a second or no greater than a millisecond.

One illustrative use of the time delay module 100 will be discussed in connection with FIGS. 1-3. For clarity, the time delay module 100 will be discussed with reference to perforating guns 62a-b. It should be appreciated, however, that certain aspects of the time delay module 100 is not limited to such use. For instance, the quick connect housing 110 may be adapted for use with other well tools.

In preparation for deployment, the upper section 112 of the quick connect housing 110 is fixed to the upper perforating gun 62a and lower section 114 of the housing 110 is fixed to the lower perforating gun 62b. The several components making up the time delay assembly 100 have already been installed in the upper and lower sections 112, 114. It should be noted that at this time the time delay assembly 100 is not functional, i.e., cannot transfer a detonation from the upper section 112 to the lower section 114.

At the rig floor, the coiled tubing string 50 is unspooled and positioned over the wellhead 44 using the lubricator 53. Thereafter, a work string 48 is conformed in a sequential manner. First, the upper perforating gun 62a is attached to the coiled tubing string 50. Next, the lower perforating gun 66b is positioned below the upper perforating gun 62a.

In order to have quick connection, the coiled tubing string 50 is lowered, which allows the connector end 118 of the upper section 112 to slide over the connector end 122 of the lower section 114. This movement causes the pin section 168 to enter the bore 140 of the collet 132. Also during this movement, the rib 176 contacts and bends the fingers 136 outward. Thereafter, the fingers 136 snap back to their nominal relaxed or un-flexed condition. Now, the locking sleeve 162 may be axially slid into to contact with the threaded shoulder region 178. Upon such contact, the locking sleeve 162 may be rotated such that the external threads 180 engage with the inner threads 184. The locking sleeve 162 is rotated until the lip 186 encloses the fingers 136, thereby preventing radial flexing of the fingers 136. In some embodiments, a screw (not shown) may be used to fix the locking sleeve 162 to the locking section 170.

Figure 3:
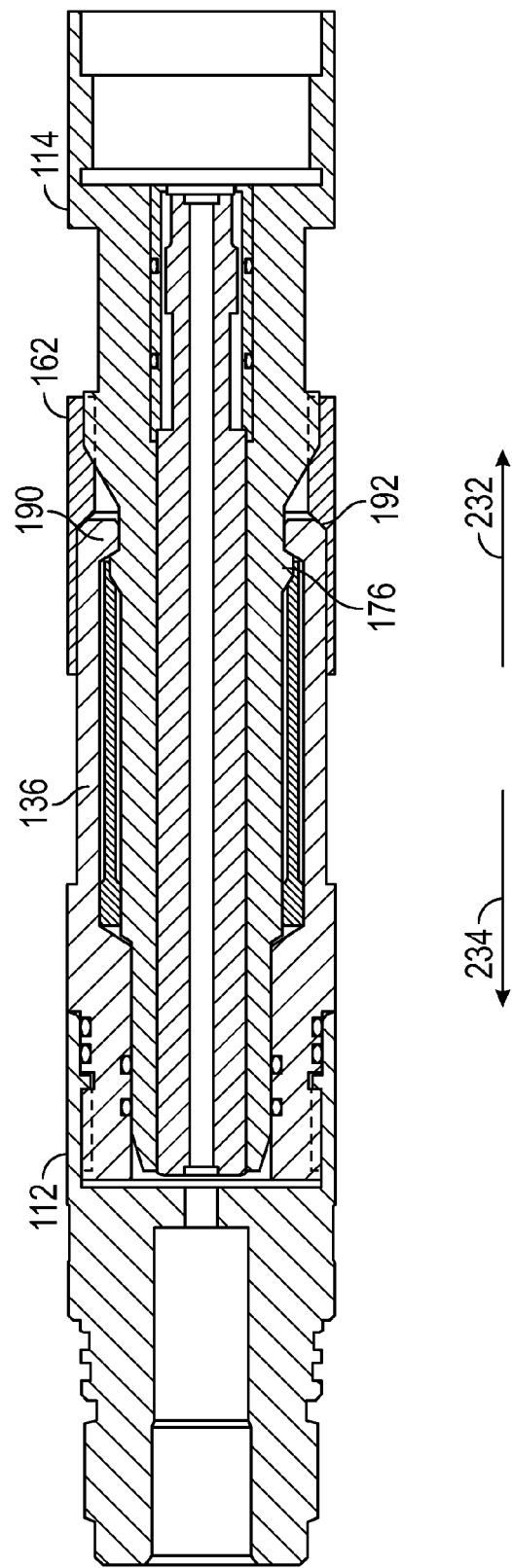
FIG. 3 illustrates a side sectional view of the FIG. 2 quick connect and time delay module in a locked state.

Referring to FIG. 3, the housing 110 is shown in a locked state. In this locked state, a locking engagement is established between the upper section 112 and the lower section 114 by the fingers 136. Specifically, a head portion 190 of the collets 136 is axially disposed between the rib 176 and a landing 192 formed on an inner surface of the locking sleeve 162. The landing 192 may be a ramped or angled surface relative to the longitudinal axis of the lower section 114. The head portion 190 provides surfaces that are transverse to a longitudinal axis of the lower section 114. Thus, the lower section 112 cannot slide in a downhole direction 232 because the rib 176 interferingly engages the head portion 190. Also, the lower section 112 cannot slide in an uphole direction 234 because the landing 192 interferingly engages the head portion 190. Further, the fingers 136 cannot flex radially outward because they are surrounded and enclosed by the lip 186.

It should be appreciated that rotational movement is limited only to locking the upper section 112 to the lower section 114. That is, a sliding action is the primarily mode to connect the upper section 112 and the lower section 114. It should also be noted that upon entering the locked state, the initiator assembly 210, the fuse assembly 220, and the detonation transfer assembly 230 are energetically coupled or connected to one another. By "energetically coupled or connected," it is meant that energy released by one device will initiate the detonation of an adjacent device.

It should be understood that the quick connection described above does not depend on orientation. The lower section 114 may be fixed to the upper gun 62a and the upper section 112 may be fixed to the lower gun 62b. In such an arrangement, the mandrel 160 of the lower section 114 can be lowered into position into the collet 132 of the upper section 112.

Once the perforating gun train 60 is positioned at the desired target depth, a firing signal is transmitted into the wellbore 38. The firing signal initiates a sequence of detonation events causes the firing of the upper gun 62a. This detonation sequence also leads to the activation of the initiator assembly 210 after the upper gun 62 fires. The initiator assembly 210 generates a high-order output that detonates the fuse element(s) 222. At this time, the perforation gun train 60 can be moved to another desired target depth. After burning for the prescribed time period, the fuse element(s) 222 detonate the detonator transfer assembly 230, which then generates a high-order output to fire the lower gun 62b.

From the above, it should be appreciated that what has been described includes an apparatus for perforating a subsurface formation using at least a first perforating gun and a second perforating gun. The apparatus may include an upper section configured to connect to the first perforating gun. The upper section may include a base having a bore and a collet disposed in the bore. The collet may include a passage and a ring having a plurality of axially projecting fingers. The apparatus may also include a lower section configured to connect to the second perforating gun. The lower section may include a mandrel having a pin section received into the passage of the collet, a locking section having a projection sized to axially engage the fingers, and a sleeve support section having a reduced diameter landing and an adjacent shoulder region on which are formed external threads. The apparatus may further include a tubular locking sleeve disposed on and surrounding the sleeve support section. The locking sleeve may include inner threads that are complementary to the external threads on the shoulder region and a lip configured to at least partially enclose the plurality of fingers.

In variants, the locking sleeve may include a landing formed on an inner surface and the fingers may each include a head portion axially engaging the projection of the mandrel locking section and the landing of the locking sleeve. The upper section and lower section may have an unlocked state defined by the fingers being disengaged from the pin section and a locked state defined by the head portions of the fingers being enclosed by the lip and interposed between the projection and the landing.

In further variants, the locking sleeve may include a bore having a first section through which the shoulder region can slide without obstruction, wherein a length of the first section is selected to allow the lip to enclose the fingers. Also, the external threads of the shoulder region may be positioned to engage the internal threads of the locking sleeve after the lip encloses the fingers.

In still further variants, the base may further include a chamber in communication with the bore via a passage, and the mandrel may further includes a chamber in communication with an adjacent bore. The apparatus may also include a time delay module having an initiator assembly disposed in the base chamber, a fuse assembly disposed in mandrel bore, and detonation transfer assembly disposed in the mandrel chamber.

In variants, the initiator assembly may be only energetically coupled to the fuse assembly during the locked state. In still further variants, the initiator assembly generates a high-order output when activated by the firing of the first perforating gun, the fuse assembly is detonated by the high-order output, and the detonator assembly initiates the firing of the second gun when activated by the fuse assembly.

For the above, it should also be appreciated that what has been described includes an apparatus for perforating a subsurface formation. The apparatus may include a first perforating gun; a second perforating gun axially spaced apart from the first perforating gun; and a quick connect assembly selectively connecting the first perforating gun and the second perforating gun. The quick connect assembly may include an upper section configured to connect to the first perforating gun, the upper section including a base having a chamber in communication with a bore via a passage, a collet disposed in the bore, the collet including a passage and a ring having a plurality of axially projecting fingers, wherein each finger includes a head portion, and a lower section configured to connect to the second perforating gun, the lower section including: a mandrel having: a chamber in communication with an adjacent bore, a pin section received into the passage of the collet, a locking section having a projection sized to axially engage the fingers, and a sleeve support section having a reduced diameter landing and an adjacent shoulder region on which are formed external threads, and a tubular locking sleeve disposed on and surrounding the sleeve support section, the locking sleeve including inner threads that are complementary to the external threads of the shoulder region, a lip configured to at least partially enclose the fingers, and a landing formed on an inner surface that axially engages the head portions of the fingers, wherein the upper section and lower section have an unlocked state defined by the fingers being disengaged from the pin section and a locked state defined by the head portions of the fingers being enclosed by the lip and axially interposed between the projection and the landing.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. An apparatus for perforating a subsurface formation using at least a first perforating gun and a second perforating gun, comprising:
   an upper section configured to connect to the first perforating gun, the upper section including:
      a base having a bore,
      a collet disposed in the bore, the collet including a passage and a ring having a plurality of axially projecting fingers, and
   a lower section configured to connect to the second perforating gun, the lower section including:
      a mandrel having:
         a pin section received into the passage of the collet,
         a locking section having a projection sized to axially engage the fingers, and
         a sleeve support section having a reduced diameter landing and an adjacent shoulder region on which are formed external threads, and
         a tubular locking sleeve disposed on and surrounding the sleeve support section, the locking sleeve including inner threads that are complementary to the external threads on the shoulder region and a lip configured to at least partially enclose the plurality of fingers
      wherein the locking sleeve includes a landing formed on an inner surface and the fingers each include a head portion axially engaging the projection of the mandrel locking section and the landing of the locking sleeve, wherein the upper section and lower section have an unlocked state defined by the fingers being disengaged from the pin section and a locked state defined by the head portions of the fingers being enclosed by the lip and interposed between the projection and the landing.

2. The apparatus of claim 1, wherein the locking sleeve includes a bore having a first section through which the shoulder region can slide without obstruction, wherein a length of the first section is selected to allow the lip to enclose the fingers.

3. The apparatus of claim 2, wherein the external threads of the shoulder region are positioned to engage the internal threads of the locking sleeve after the lip encloses the fingers.

4. The apparatus of claim 1, wherein the base further includes a chamber in communication with the bore via a passage, and the mandrel further includes a chamber in communication with an adjacent bore, and further comprising a time delay module having:
   an initiator assembly disposed in the base chamber;
   a fuse assembly disposed in mandrel bore; and
   detonation transfer assembly disposed in the mandrel chamber.

5. The apparatus of claim 4, wherein the initiator assembly is only energetically coupled to the fuse assembly during the locked state.

6. The apparatus of claim 4, wherein the initiator assembly generates a high-order output when activated by the firing of the first perforating gun, wherein the fuse assembly is detonated by the high-order output, and wherein the detonator assembly initiates the firing of the second gun when activated by the fuse assembly.

7. An apparatus for perforating a subsurface formation, comprising:
   a first perforating gun;
   a second perforating gun axially spaced apart from the first perforating gun;
   a quick connect assembly selectively connecting the first perforating gun and the second perforating gun, the quick connect assembly comprising:
      an upper section configured to connect to the first perforating gun, the upper section including:
         a base having a chamber in communication with a bore via a passage,
         a collet disposed in the bore, the collet including a passage and a ring having a plurality of axially projecting fingers, wherein each finger includes a head portion, and
      a lower section configured to connect to the second perforating gun, the lower section including:
         a mandrel having:
            a chamber in communication with an adjacent bore,
            a pin section received into the passage of the collet,
            a locking section having a projection sized to axially engage the fingers, and
            a sleeve support section having a reduced diameter landing and an adjacent shoulder region on which are formed external threads, and
         a tubular locking sleeve disposed on and surrounding the sleeve support section, the locking sleeve including inner threads that are complementary to the external threads of the shoulder region, a lip configured to at least partially enclose the fingers, and a landing formed on an inner surface that axially engages the head portions of the fingers, wherein the upper section and lower section have an unlocked state defined by the fingers being disengaged from the pin section and a locked state defined by the head portions of the fingers being enclosed by the lip and axially interposed between the projection and the landing.

8. The apparatus of claim 7, further comprising a time delay module having:
- an initiator assembly disposed in the base chamber, wherein the initiator assembly generates a high-order output when activated by the firing of the first perforating gun;
- a fuse assembly disposed in mandrel bore, wherein the fuse assembly is detonated by the high-order output, wherein the initiator assembly is only energetically coupled to the fuse assembly during the locked state; and
- detonation transfer assembly disposed in the mandrel chamber wherein the detonator assembly initiates the firing of the second gun when activated by the fuse assembly.

9. The apparatus of claim 8, wherein a duration of the detonation of the initiator assembly is no greater than a second, wherein a burn time of the fuse assembly is at least a minute, and wherein a duration of the detonation of the detonation transfer assembly is no greater than a second.

* * * * *